United States Patent [19]
Hartwig

[11] Patent Number: 5,803,375
[45] Date of Patent: Sep. 8, 1998

[54] VERTICAL MIXER

[75] Inventor: Gert Luthar Hartwig, Wetaskiwin, Canada

[73] Assignee: Alteen Distributors Ltd., Wetaskiwin, Canada

[21] Appl. No.: 621,343

[22] Filed: Mar. 25, 1996

Related U.S. Application Data

[63] Continuation-in-part of Ser. No. 592,668, Jan. 26, 1996, abandoned.

[51] Int. Cl.[6] .................................................... B02C 18/08
[52] U.S. Cl. ...................... 241/28; 241/29; 241/101.761; 241/260.1; 241/605
[58] Field of Search ....................... 241/28, 29, 101.761, 241/260.1, 605, 138

[56] References Cited

U.S. PATENT DOCUMENTS

| | | | |
|---|---|---|---|
| 3,325,106 | 6/1967 | Hoffman, Jr. et al. | 241/260.1 X |
| 4,799,800 | 1/1989 | Schuler . | |
| 4,949,916 | 8/1990 | Wroblewski | 241/260.1 X |
| 5,061,081 | 10/1991 | Walley . | |
| 5,082,188 | 1/1992 | Urich | 241/56 |
| 5,294,064 | 3/1994 | Faccia . | |
| 5,456,416 | 10/1995 | Hatwig | 241/260.1 |
| 5,553,938 | 9/1996 | Faccia | 241/101.761 X |
| 5,615,839 | 4/1997 | Hartwig | 241/260.1 |

FOREIGN PATENT DOCUMENTS

| | | |
|---|---|---|
| 825002 | 10/1969 | Canada . |
| 1227996 | 10/1987 | Canada . |
| 1227997 | 10/1987 | Canada . |

Primary Examiner—John M. Husar
Attorney, Agent, or Firm—Spencer & Frank

[57] ABSTRACT

There is provided a new and useful method and apparatus for use in the cutting, processing and discharge of material. The apparatus comprises a container having a first cutter driven about a vertical axis by a first motor, a housing radially open to the container having a second cutter driven by a second motor which second cutter rotates in the same direction as the first cutter and which second cutter protrudes radially into the container and discharge means for selectively discharging processed material from the container.

84 Claims, 6 Drawing Sheets

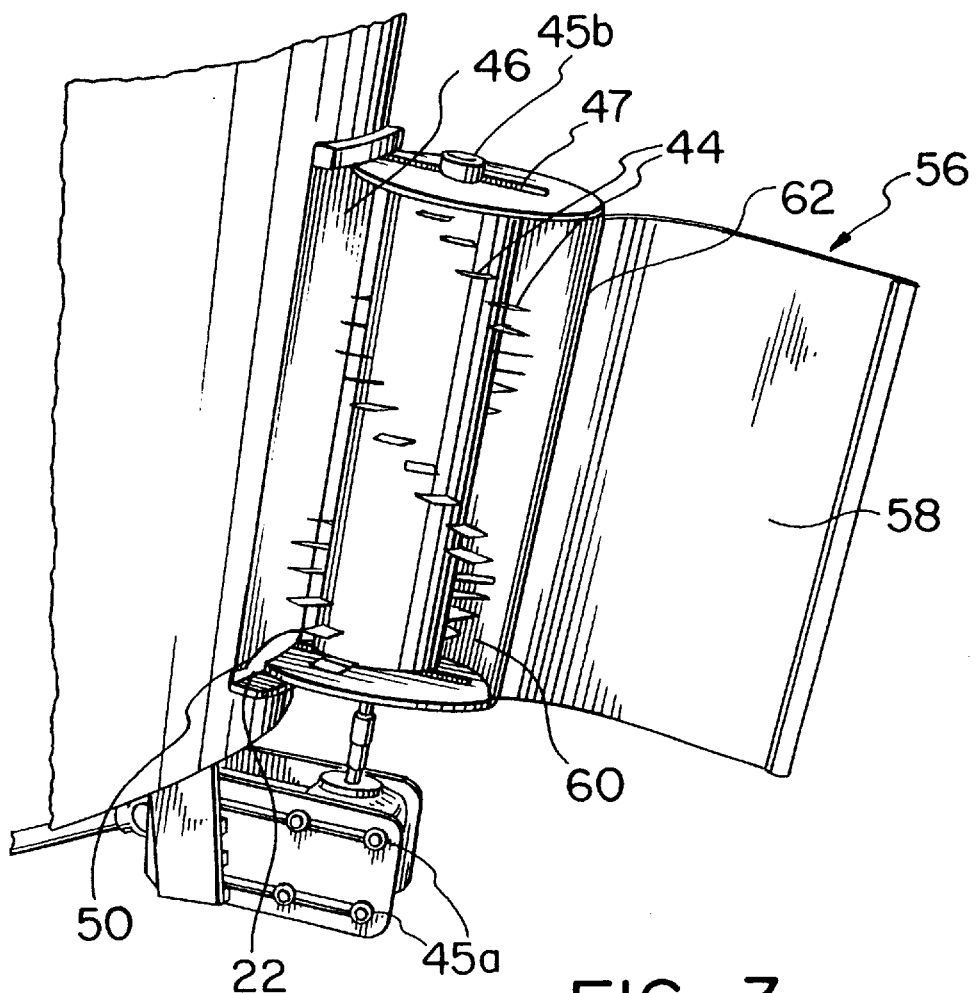
FIG. 3
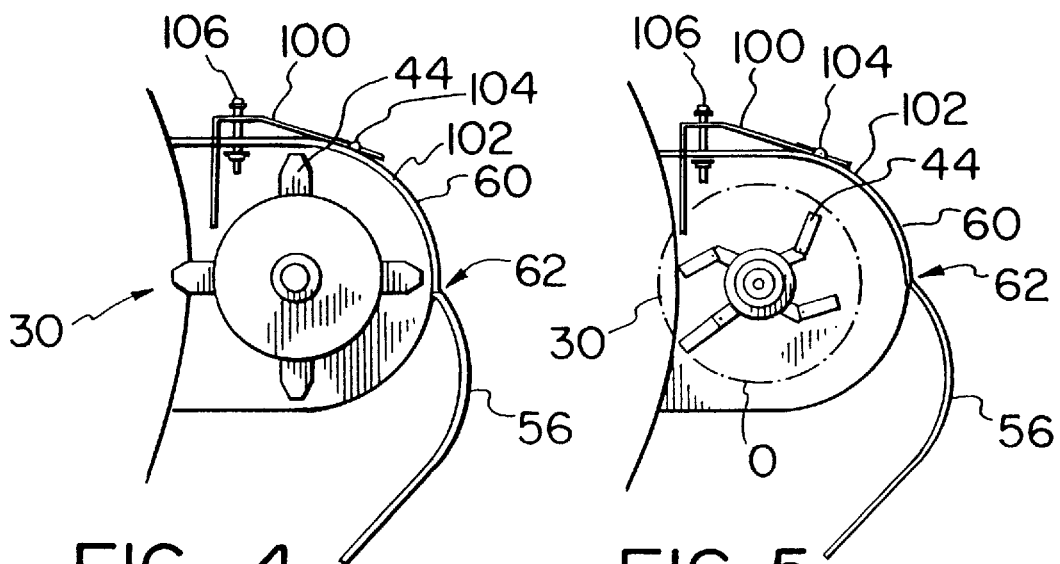
FIG. 4
FIG. 5

VERTICAL MIXER

REFERENCE TO RELATED CASES

This application is a continuation-in-part of a U.S. patent application Ser. No. 08/592,668 filed Jan. 26, 1996, now abandoned, entitled "Vertical Mixer" by the same inventor herenin.

FIELD OF THE INVENTION

This application relates to vertical mixers for the cutting, processing and discharge of material.

BACKGROUND OF THE INVENTION

It is known to be desirable to quickly and efficiently process quantities of bulk material, such as bales of fibrous material, for various purposes. One such purpose is in processing bales of hay and straw into feed for cattle and other livestock. To that end, it is desirable to have a single apparatus capable of accepting bulk material in a variety of sizes and forms, cutting that material to a range of pre-determined desired lengths, processing that material within the apparatus to chosen consistencies and discharging the mixed feed preparation as required in the field. As much of the work of this apparatus is done in the field as an "on-the-go" concern, time is of the essence. Reduced cutting and processing time results in ultimately lower costs and higher productivity for the farmer.

Machines currently available to perform any one of these functions each suffer from at least one of several common problems. Often, the opening of the apparatus is partially obstructed by a cross-support member, thus limiting the usefulness of the machine to larger masses of material. In addition, many of the cutting means currently used are unable to cut frozen, partially frozen or rotted hay or silage, without substantial damage to both the machine and the forage.

Those machines that provide improved cutting by means of high speed cutters will sacrifice the quality and consistency of the mix, thus requiring a second stage of processing in which the material is removed from the main apparatus, passed through a secondary cutting chamber and then re-introduced into the main apparatus for further cutting as necessary. The time and cost disadvantages inherent in such a system are readily apparent.

Other disadvantages present in some of the existing systems include incomplete or inconsistent processing due to the configuration of the cutters and the grinding and tearing of the fibrous material against the sidewalls or corners of the machines. In addition, discharge of the material from existing systems is slow, cumbersome and limited to heavier materials in smaller lengths. In particular, in a machine using a low speed cutter, there is not sufficient force to properly discharge lighter materials such as forage, straw or hay when in medium or longer lengths.

Thus, many of the apparatus described in the prior art suffer from some or all of the disadvantages thus described. Reference is made, for example, to U.S. Pat. No. 5,061,081 of Walley, issued Oct. 29, 1991, U.S. Pat. No. 5,294,064 of Faccia, issued Mar. 15, 1994, Canadian Patent No. 1,227, 996 of John et al, issued Oct. 13, 1987 and Canadian Patent No. 1,227,997 of John et al, issued Oct. 13, 1987.

SUMMARY OF THE INVENTION

In one aspect of the invention there is provided an apparatus for use in the cutting, processing and discharge of material. The apparatus comprises a container having a first cutter driven about a vertical axis by a first motor, a housing radially open to the container having a second cutter driven by a second motor which second cutter protrudes radially into the container and discharge means for selectively discharging processed material from the container.

In a preferred embodiment of the invention, the first cutter comprises a conical support having a helical carrier and a plurality of blades mounted on said carrier and projecting therefrom, rotatable about a vertical axis.

In another preferred embodiment of the invention, the second cutter is rotatable about an axis substantially parallel to the sidewall of the container and comprises a plurality of blades radially extending relative to that axis.

In a most preferred embodiment of the invention, there is provided a slidable cover selectively moveable relative to the radial opening between the container and the housing, limiting exposure of the second cutter to the fibrous material.

In another highly preferred embodiment, a radial discharge opening is provided in a wall of said housing.

The apparatus of the present invention thus provide s a means of cutting, processing and discharging material, such as fibrous material. The apparatus provides for the secondary cutting and improved processing of the fibrous material while the material is being cut and mixed within the container.

In another aspect of the invention there is provided a method for the cutting, processing and discharge of material within an apparatus comprising a container which has a first cutter rotating about a vertical axis and a housing opening radially thereto along a sidewall of the container. The housing has a second cutter rotating about an axis. The method comprises the steps of: arranging a portion of the second cutter to project radially into the container; loading the material in bulk into the container; rotating the first cutter in a first direction to cut and rotate the material; and one of (a) rotating said second cutter in the same direction as said first direction, such that the extremities of the cutters are travelling in opposite directions at a plane where they intersect, thereby further cutting and processing said material within said container; and discharging said further cut and processed material from said apparatus; or (b) rotating said second cutter in the same direction as said first direction while maintaining a discharge door on said housing in an open position.

BRIEF DESCRIPTION OF THE DRAWINGS

These and other advantages of the invention will become apparent upon reading the following detailed description and upon referring to the drawings in which:

FIG. 3 is a perspective view of the second cutter with a part of the housing in an open position.

FIG. 4 is a top plan view of an embodiment of the second cutter.

FIG. 5 is a top plan view of another embodiment of the second cutter.

Figure 1:
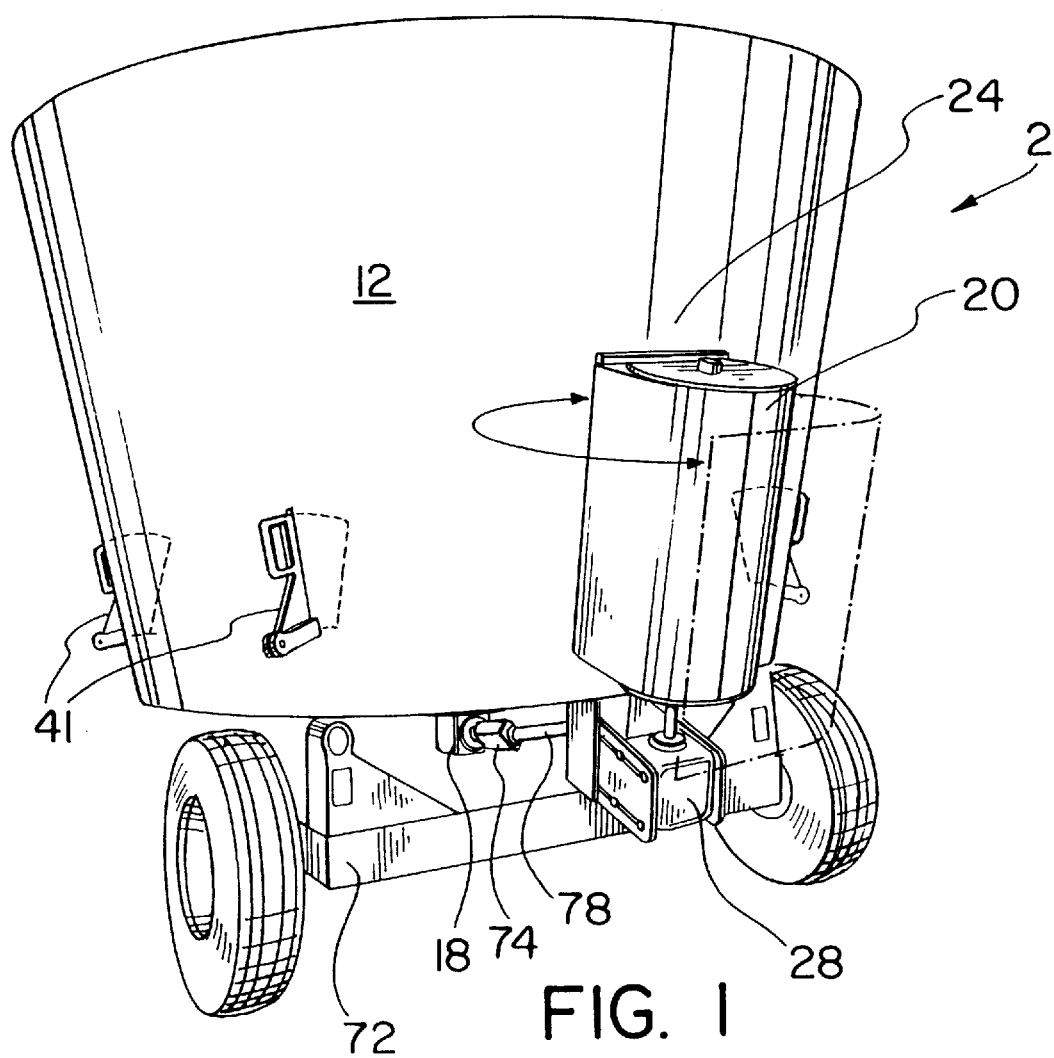
FIG. 1 is a perspective view of the invention.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Figure 2:
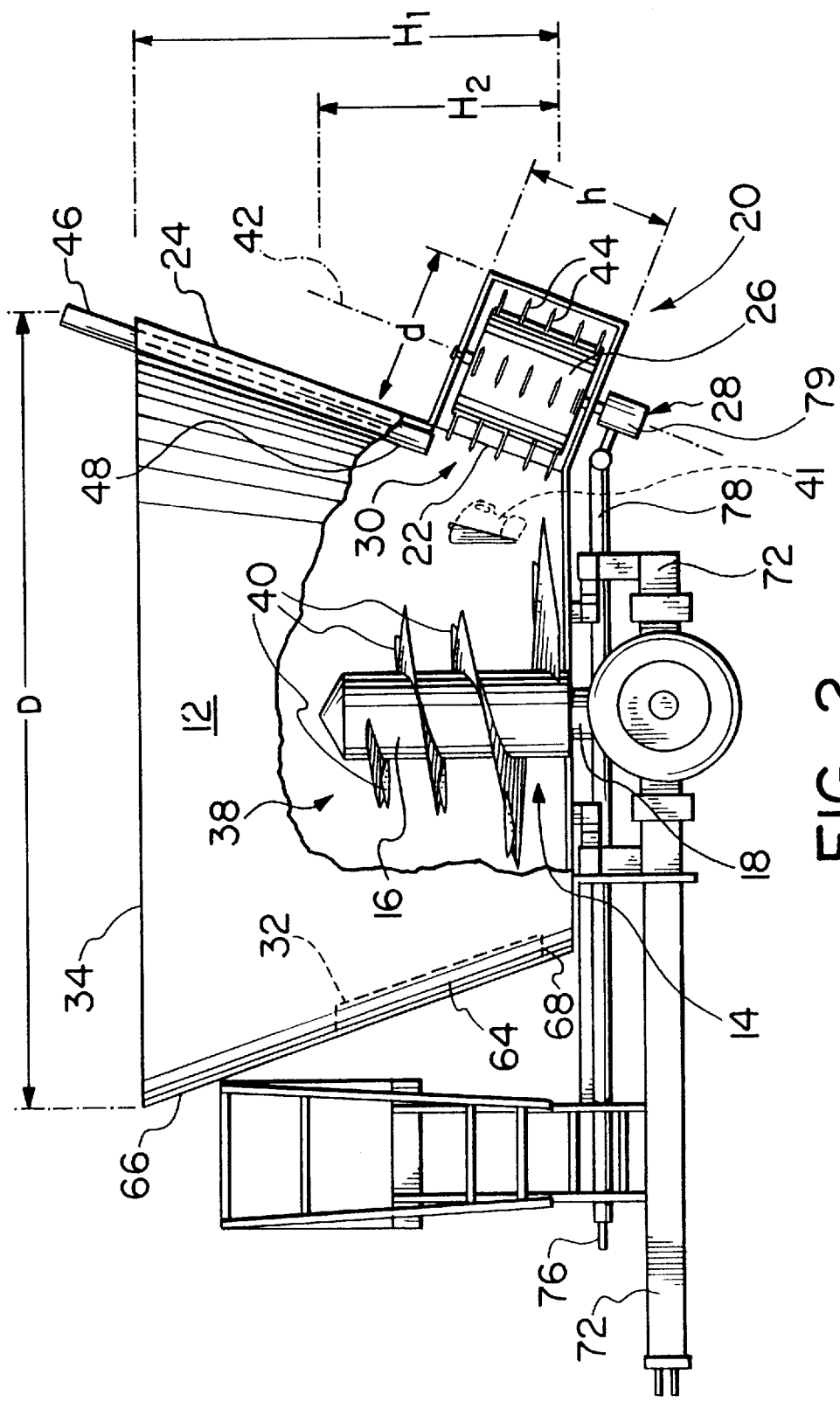
FIG. 2 is a side elevation of the invention with a partial cutaway of part of the sidewall of the container.

Turning to the drawings, FIG. 1 illustrates an apparatus 2 for use in the cutting, processing and discharge of a mass 10 of material (not illustrated), such as fibrous material such as hay. As seen in FIG. 2, the apparatus 2 comprises a container 12 having a first cutter 14 mounted on a vertical axis 16 and rotated about axis 16 by a first driver 18.

There is provided a housing 20 mounted to and radially open to the container 12 at the radial opening 22 through a sidewall 24 of the container 12. The housing 20 contains a second cutter 26 driven by a second driver 28. The second cutter 26 protrudes radially, relative to its own axis of rotation, into the container 12 as shown generally at 30.

The apparatus is further provided with discharge means 32 within container 12 for the discharge of the processed material (not shown) at desired locations in the field as required.

The container 12 is generally of an inverted truncated conical configuration with height $H_1$ and such that the diameter D at top end 34 is greater than the diameter at the bottom end 36. Height $H_1$ is generally within the range of 94 inches to 122 inches, thus providing a capacity within the container 12 of generally in the range of 350 cubic feet to 700 cubic feet.

The first cutter 14 preferably has a helical support configuration, shown generally at 38, and comprises a plurality of blades 40 projecting therefrom rotatable about the vertical axis 16. The axis 16 of the first cutter 14 preferably extends vertically within the container 12 to a height $H_2$, substantially half of height $H_1$. In an alternate embodiment of the invention, the first cutter 14 may preferably have a helical configuration and comprise a continuous blade 39 (not illustrated) along said support configuration 38 and rotatable about the vertical axis. The container 12 may preferably include a plurality of adjustable restrictor blades 41 which project into container 12 to increase the efficiency of the cutting and processing of material.

The housing 20 is of height h and diameter d. Height h is in the range of 10 to 50 inches and preferably 32 inches and diameter d is in the range of 8 to 36 inches and preferably 21 inches. The second cutter 26 rotates about axis 42 which may be varied between the vertical and the horizontal, however, which is preferably substantially parallel to the sidewall 24. The second cutter 26 comprises a plurality of cutting blades 44 radially extending relative to the axis 42. The cutting blades 44 rotate about axis 42 and protrude into the container 12 through the radial opening 22 in sidewall 24 as shown generally at 30.

The second cutter 26 is preferably selectively moveable inwardly and outwardly of the sidewall 24 for varying the extent of the protrusion 30 of the cutting blades 44 through the radial opening 22 into the container 12, and thus into the orbit of rotation of the material 10 (not shown) within the container 12. The cutter 26 is selectively moveable by adjusting bolts 45a and 45b and re-positioning the cutter 26 within shaft 47. The protrusion 30 may preferably vary within the range of ½ inch to 4 inches, with the preferred position of the second cutter 26 being such that the protrusion 30 is approximately 4 inches into the container 12. There is also the possibility of eliminating the protrusion 30 altogether.

There may be circumstances of use where the whole of the second cutter 26 is not required for the efficient cutting and processing of the mass of material 10. There is therefore further provided an inner slidable cover 46 of convex configuration relative to the radial opening 22 mounted to the sidewall 24 and selectively moveable over the radial opening 22 and blades 44 over a range of positions between the fully open position 48 (as seen in FIG. 2) and fully closed position 50 (as seen in FIG. 3). The cover 46 may thus be adjusted to an intermediate height relative the opening 22 such that only a portion of the protrusion 30 of the cutter blades 44 comes in contact with the rotating mass of material within container 12.

In embodiments where the second cutter 26 is moveable, the second cutter 26 may be moved outwardly from the radial opening 22 such that there is no protrusion 30 into the container 12. In such instances, slidable cover 46 may be in the fully closed position 50 thus eliminating the unwanted possibility of material 10 passing into the housing 20 during cutting or processing when second cutter 26 is not operating.

Figure 6:
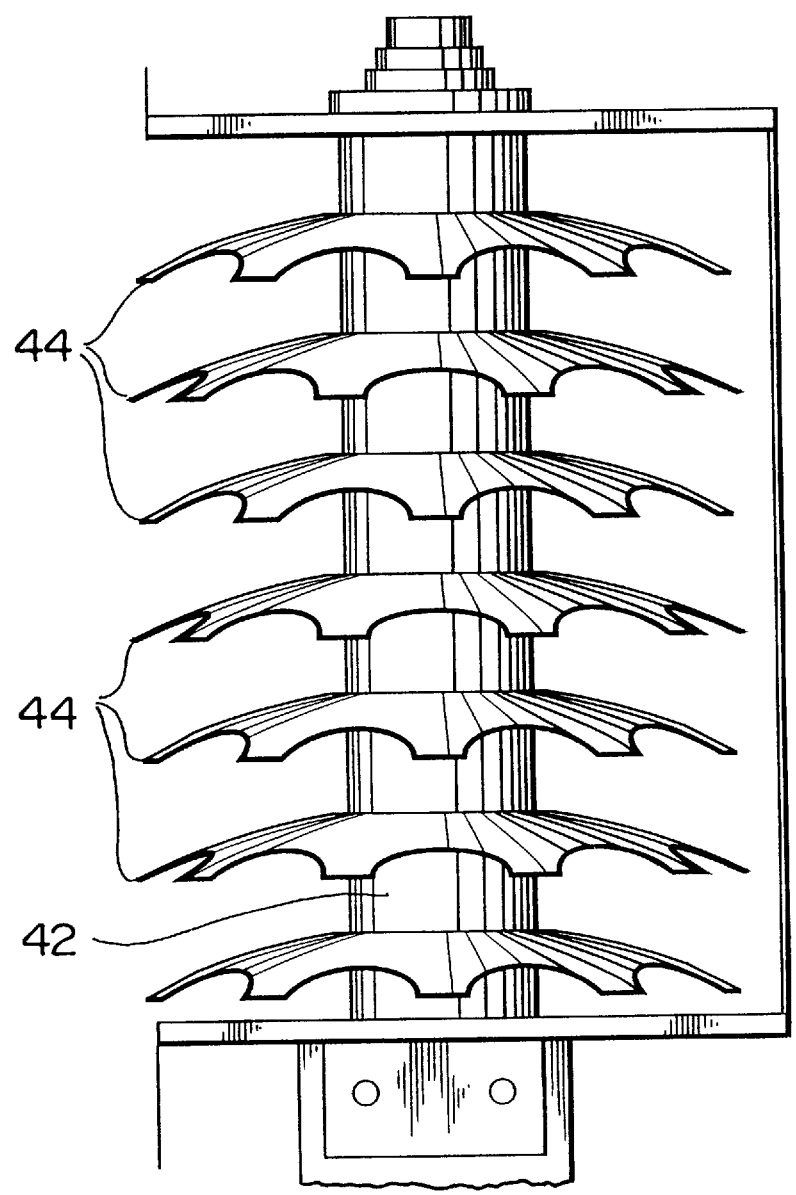
FIG. 6 is a side elevation of another embodiment of the second cutter.

The cutting blades 44 may comprise a plurality of knives as shown in FIGS. 3 and 4, a plurality of cutting flails as shown in FIG. 5 or a plurality of disc blades as shown in FIG. 6. The knives may comprise 6 inch long hammer knives. The flails are flexible and assume an elongate position when in operation (not illustrated). The disc blades have a diameter in the range of 16 to 24 inches.

Figure 7:
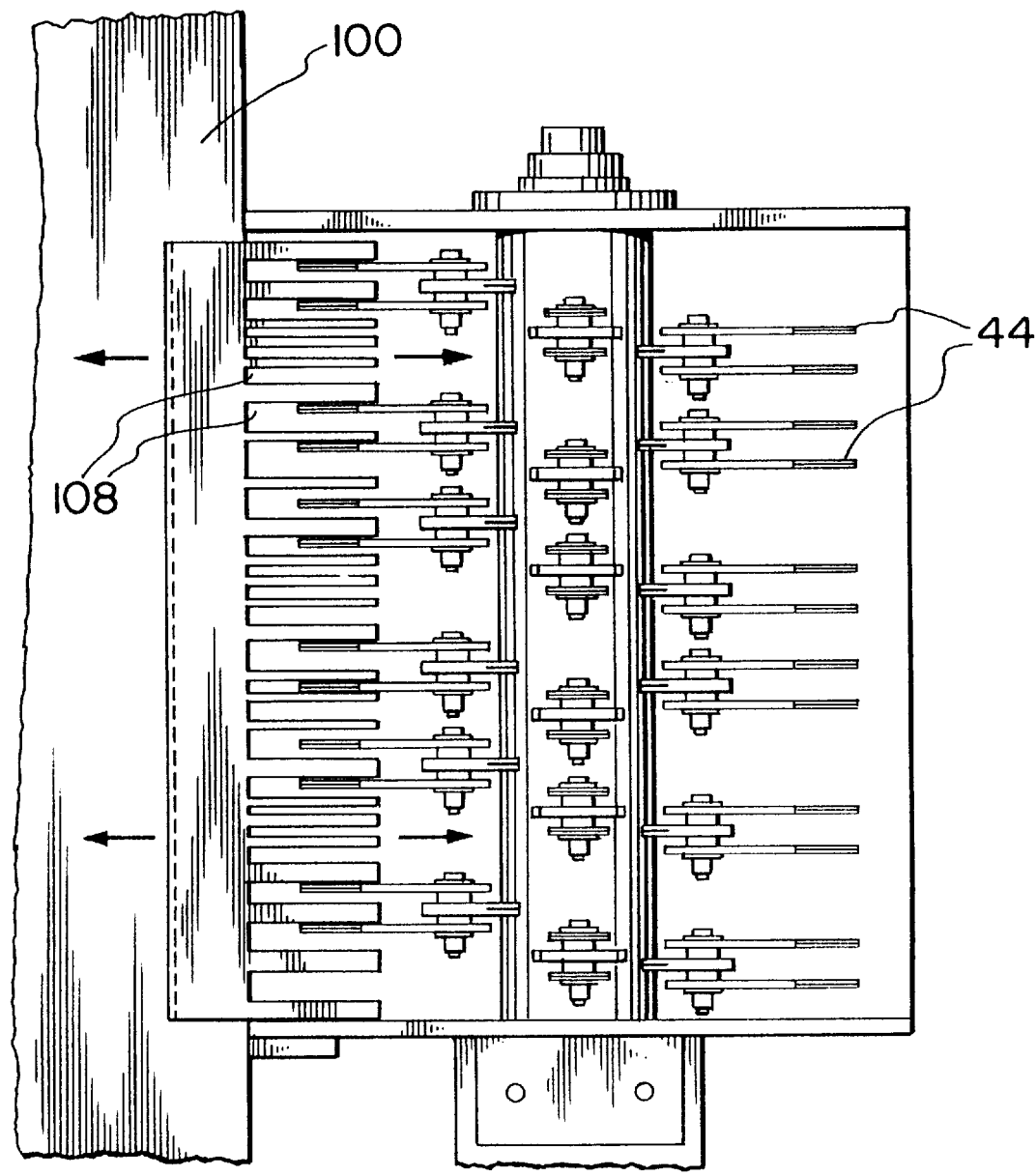
FIG. 7 is a side elevation of the housing with second cutter and restrictor plate in engaging relation.
Figure 8:
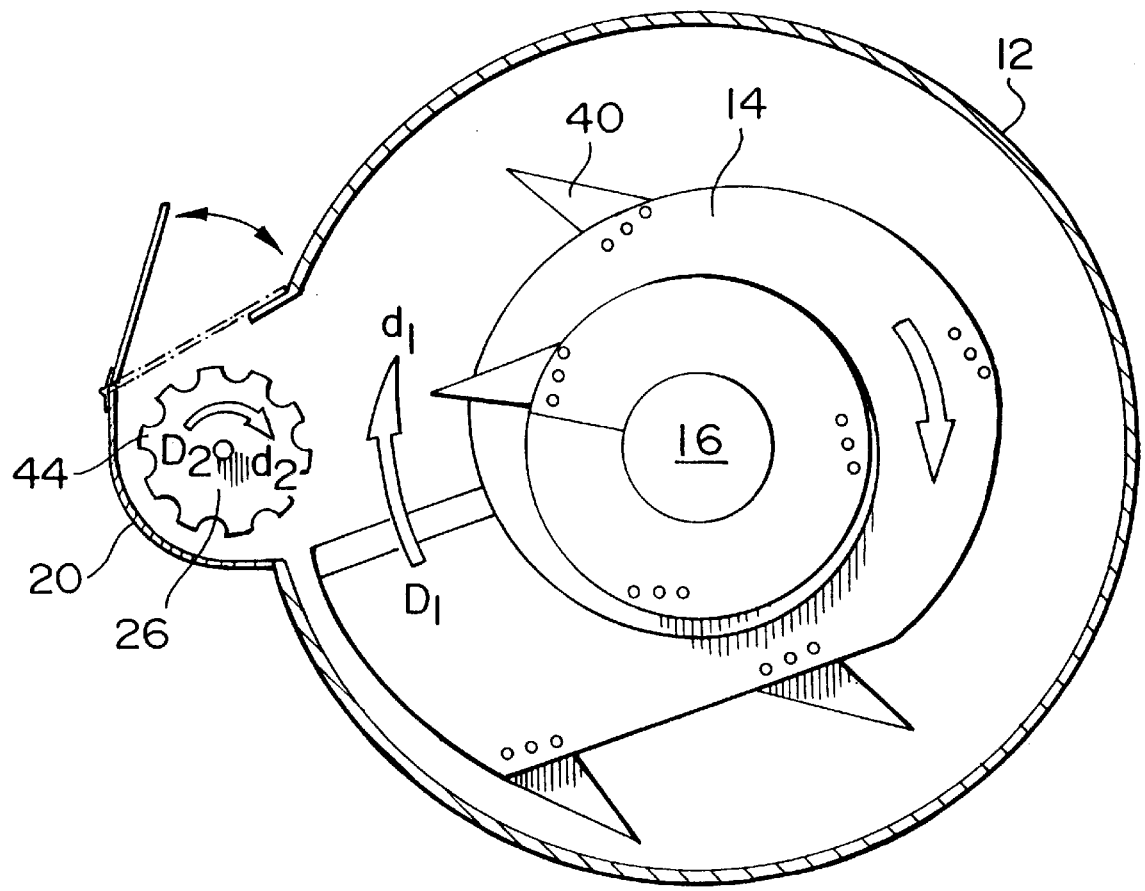
FIG. 8 is a top plan view of an embodiment of the apparatus in accordance with the present invention.

The housing 20 may further preferably comprise a restrictor plate 100 mounted to a sidewall 102 of housing 20 to minimize unwanted entry of material into the housing 20. The plate 100 is mounted to sidewall 102 at hinge 104 and comprises a bolt 106 which can be tightened or loosened to vary the projection of plate 100 into the orbit of rotation o of cutting blades 44. As best illustrated in FIG. 7, the plate 100 further preferably comprises a plurality of apertures 108 through which the cutting blades 44 may pass to cut and process the material 10 within the container 12.

The housing 20 further comprises a door 56 created by having a first portion 58 of rear wall 60 hinged longitudinally at 62. The operator is thus permitted entry to the housing 20 in order to clean the housing 20, the second cutter 26 and remove any unwanted material 10 which may have entered the housing 20 during operation of the apparatus 2. The door 56 may also serve to allow discharge of the processed material from the apparatus 2 to spread excess amounts of the processed material as bedding for livestock.

When cover 46 is at least partly open and door 56 is open, longer lengths of the material can be readily and easily discharged if re-cutting in the container is not required. The centrifugal force exerted upon the material by the second cutter 26, which is rotating in the 1,000 to 3,000 r.p.m. range, forces the material out from the apparatus 2, typically 20 to 30 feet from the apparatus 2.

This greatly facilitates discharge of lighter material from container 12. Such material may not discharge satisfactorily through outlet 32 because of the slow speed of rotation of cutter 38.

The discharge means 32 of the container 12 comprises a hydraulically operated door 64 within sidewall 66. The discharge door 64 is selectively moveable throughout a range of positions between a closed position 68 and an open position 70 (not illustrated) for the selective discharge of processed fibrous material as required, either alone or in combination with discharge from the housing 20.

The apparatus 2 may be mounted on a mounting chassis 72 which in turn is connected to a tractor (not shown) or can be mounted on a truck (not shown) to create a self-contained mobile unit. In use, a portion of the second cutter 26 is arranged such that it protrudes radially into the container 12. The first cutter 14 is rotated by the first driver 18 which comprises a first planetary gearbox 74 that draws its power from a direct mechanical connection to the tractor power take-off along first shaft 76 (or from the power supply of the truck). Thus, the first cutter 14 can cut and process the material 10 while rotating at very low speeds, typically in the order of 26 to 45 rpm, thereby requiring very low horsepower to operate. The second driver 28 is connected by second shaft 78, through planetary gearbox 79, to the power take-off source of the tractor (or the power source of the truck). The second driver 28 rotates the second cutter 26 in either the opposite direction or, preferably, the same direction (indicated as $D_2$) as the direction (indicated as $D_1$) of rotation of the first cutter 14 and preferably at significantly greater speed than the first cutter 14. It typically requires approximately 30 hp to run the second cutter 26 at the desired speeds in the range of 1000 to 3000 revolutions per minute and preferably 2000 rpm. In rotating the second cutter in the same direction as the first cutter, the extremities of the respective cutters are thus travelling in opposite directions, $d_1$ and $d_2$ respectively, at a plane where they intersect, typically in the radial opening.

As thus described, in use, the mass of material 10 (not illustrated) is placed within the container 12 and the first cutter 14 is rotated to cut and process the material. The centrifugal force pushes the larger pieces of the fibrous material outwardly within the container 12. At the protrusion 30, the second cutter 26 cuts the material into smaller pieces which pieces then move inwardly within the container 12 as the remaining larger pieces move outwardly to pass through the second cutter 26. In use with door 56 of housing 20 closed, any material which passes into housing 20 is recirculated back into container 12 for continuous processing and this process continues until the material has been sufficiently cut and processed to the desired length and consistency. It has been found that the use of this secondary cutting process and apparatus reduces the overall cutting and processing time in the order of 80% from the time required to process the same amount of material using conventional processes and apparatus.

For improved efficiency, the operation may be continuous such that there is a continuous loading of material 10 into container 12 as the processed material is being discharged for use. The material 10 is thus loaded at such a rate so as to maintain a fairly constant level of material within container 12 without impeding the benefits of operation resulting from the second cutter 26 thus described.

Thus, it is apparent that there has been provided in accordance with the invention an apparatus for use in the cutting, mixing and discharge of fibrous material that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

I claim:

1. An apparatus for use in the cutting, processing and discharge of material, said apparatus comprising:
    a container having a first cutter driven about a vertical axis by a first driver;
    a housing having a radial opening to said container along a sidewall of said container, said housing having therein a second cutter driven by a second driver, said second cutter protruding radially into said container and rotatable about a second axis, said second axis being upwardly oriented so that said second cutter thereby cutting and processing said material within said container;
    discharge means for selectively discharging processed material from said apparatus.

2. The apparatus of claim 1 wherein said container is of inverted truncated conical configuration.

3. The apparatus of claim 1 wherein said first cutter comprises a support of helical configuration having a plurality of blades projecting therefrom and rotatable about a vertical axis.

4. The apparatus of claim 1 wherein said first cutter comprises a continuous helical blade.

5. The apparatus of claim 1 wherein said first cutter rotates at speeds in the range of 26 to 45 revolutions per minute.

6. The apparatus of claim 5 wherein said second driver has a gear reduction ratio such that said second driver rotates said second cutter in the range of 1000 to 3000 revolutions per minute.

7. The apparatus of claim 5 wherein said second driver has a gear reduction ration such that said second driver rotates said second cutter at about 2000 revolutions per minute.

8. The apparatus of claim 1 wherein said first driver comprises a direct mechanical connection from a power take-off of a tractor or a truck through a planetary gearbox.

9. The apparatus of claim 1 wherein said housing has a height in the range of 10 to 50 inches and a diameter in the range of 8 to 36 inches.

10. The apparatus of claim 9 wherein the housing has a height of 32 inches and a diameter of 21 inches.

11. The apparatus of claim 1 including a slidable cover selectively moveable relative to said radial opening between said housing and said container to selectively close said opening to limit exposure of said second cutter to said material.

12. The apparatus of claim 11 including a door in a rear wall of said housing.

13. The apparatus of claim 1 wherein said second cutter comprises a plurality of blades radially extending relative to said axis.

14. The apparatus of claim 1 wherein said second cutter comprises knives.

15. The apparatus of claim 14 wherein said knives are 6 inch long hammer knives.

16. The apparatus of claim 1 wherein said second cutter comprises cutting flails.

17. The apparatus of claim 1 wherein said second cutter comprises disc blades.

18. The apparatus of claim 17 wherein said disc blades have a diameter in the range of 16 to 24 inches.

19. The apparatus of claim 1 wherein said second driver comprises a direct mechanical connection from a power take-off of a tractor or a truck through a planetary gearbox.

20. The apparatus of claim 1 wherein said second cutter is selectively moveable inwardly and outwardly of said sidewall for varying the extent to which said second cutter protrudes into said container.

21. The apparatus of claim 1 wherein said second cutter protrudes into said container by at least 0.5 inches and at most 4 inches.

22. The apparatus of claim 21 wherein said second cutter protrudes into said container by about three inches.

23. The apparatus of claim 1 wherein said second axis is substantially vertical.

24. The apparatus of claim 1 wherein said second axis is substantially parallel to said sidewall.

25. The apparatus of claim 1 including a plate selectively moveable through a plurality of positions and projectable into an orbit of rotation of said second cutter to restrict entry of said material into said housing.

26. The apparatus of claim 25 including a plurality of apertures in said plate to permit access of said second cutter to said material within said container.

27. The apparatus of claim 1 wherein said discharge means comprises a door on a sidewall of said container.

28. The apparatus of claim 27 wherein said door is hydraulically operated.

29. The apparatus of claim 1 including a door in a rear wall of said housing.

30. The apparatus of claim 29 wherein said door is longitudinally hinged.

31. The apparatus of claim 1 wherein said discharge means comprises at least one of a hydraulically operated door on a sidewall of said container or a longitudinally hinged door in a rear wall of said housing.

32. The apparatus of claim 1 wherein said first driver and said second driver rotate said first cutter and said second cutter in the same direction.

33. The apparatus of claim 1 wherein said first driver and said second driver rotate said first cutter and said second cutter in opposite directions.

34. An apparatus for the cutting, processing and discharge of fibrous material comprising a container of inverted truncated conical configuration having a first cutter comprised of a support of helical configuration and having a plurality of blades projecting therefrom and rotatable about a vertical axis, said first cutter driven by a first driver; a housing having a radial opening to said container along a sidewall of said container having a second cutter rotatable about a second axis substantially parallel to said sidewall and comprising a plurality of blades radially extending relative to said second axis, said second cutter selectively moveable inwardly and outwardly of said sidewall for varying the extent to which said second cutter protrudes into said container, said second cutter driven by a second driver; discharge means for selectively discharging processed material from said apparatus comprising a hydraulically operated door on a sidewall of said container and a longitudinally hinged door in a rear wall of said housing, said hinged door to allow discharge of partially processed material to be spread as bedding for livestock.

35. A method for the cutting, processing and discharge of material within an apparatus comprising a container having a first cutter rotating about a vertical axis, a housing having a radial opening thereto along a sidewall of said container, said housing having a second cutter rotating about a second substantially vertical axis, said method comprising the steps of:

arranging a portion of said second cutter to project radially into said container;

loading said material in bulk into said container;

rotating said first cutter in a first direction to cut and rotate said material; and one of (a) rotating said second cutter in a second direction thereby further cutting and processing said material within said container; and discharging said further cut and processed material from said apparatus; or (b) rotating said second cutter in a second direction while maintaining a discharge door on said housing in an open position.

36. The method of claim 35 wherein said second substantially vertical axis is substantially parallel to said sidewall.

37. The method of claim 35 wherein said second direction is the same direction as said first direction.

38. The method of claim 35 wherein said second direction is opposite to said first direction.

39. The method of claim 35 comprising rotating said second cutter at greater speed than said first cutter.

40. The method of claim 39 comprising rotating said first cutter at 26 to 45 revolutions per minute and rotating said second cutter at 1000 to 3000 rpm.

41. The method of claim 35 wherein said portion of said second cutter is projected in the range of 0.5 to 4 inches into said orbit of rotation.

42. The method of claim 41 wherein said portion of said second cutter is projected 3 inches into said orbit of rotation.

43. A method for the continuous cutting, processing and discharge of material within an apparatus comprising a container having a first cutter rotating about a vertical axis, a housing having a radial opening thereto along a sidewall of said container, said housing having a second cutter rotating about a second substantially vertical axis, said method comprising the steps of:

arranging a portion of said second cutter to project radially into said container;

continuously loading said material in bulk into said container;

rotating said first cutter in a first direction to cut and rotate said material; and one of:

(a) rotating said second cutter in the same direction as said first direction, thus resulting in an extremity of said second cutter travelling in an opposite direction to an extremity of said first cutter at a plane where the extremities intersect, thereby further cutting and processing said material within said container; and continuously discharging said further cut and processed material from said apparatus as material is continuously loaded into said apparatus or (b) rotating said second cutter in the same direction as said first direction while maintaining a discharge door on said housing in an open position.

44. The method of claim 43 wherein said second substantially vertical axis is substantially parallel to said sidewall.

45. A method for the cutting, processing and discharge of material within an apparatus comprising a container having a first cutter rotating about a vertical axis, a housing having a radial opening thereto along a sidewall of said container and having a discharge door in a rear wall therein, said housing having a second cutter rotating about a second substantially vertical axis, said method comprising the steps of:

arranging a portion of said second cutter to project radially into said container;

loading said material in bulk into said container;

rotating said first cutter in a first direction to cut and rotate said material; and rotating said second cutter in the same direction as said first direction, thus resulting in an extremity of said second cutter travelling in an opposite direction to an extremity of said first cutter at a plane where the extremities intersect, while maintaining said discharge door in said housing in an open position whereby said material is discharged from said apparatus through said discharge door by means of centrifugal force.

46. The method of claim 45 wherein said apparatus includes a slidable cover over said radial opening, including the intermediate steps of:

rotating said first cutter in a first direction to cut and rotate said material while maintaining said cover in a closed position; and subsequently opening said cover.

47. The method of claim 45 wherein said second substantially vertical axis is substantially parallel to said sidewall.

48. A method for the cutting, processing and discharge of material within an apparatus comprising a container having a first cutter rotating about a vertical axis, a housing having a radial opening thereto along a sidewall of said container and having a discharge door in a rear wall therein, said housing having a second cutter rotating about a second substantially vertical axis, said method comprising the steps of:

arranging a portion of said second cutter to project radially into said container;

loading said material in bulk into said container;

rotating said first cutter in a first direction to cut and rotate said material; and rotating said second cutter in the same direction as said first direction, thus resulting in an extremity of said second cutter travelling in an opposite direction to an extremity of said first cutter at a plane where the extremities intersect, while maintaining said discharge door in said housing in an closed position whereby said material is forced from said housing into said container and discharged from said container.

49. The method of claim 48 wherein said second substantially vertical axis is substantially parallel to said sidewall.

50. A method for the cutting, processing and discharge of material within an apparatus comprising a container having a first cutter rotating about a vertical axis, a housing having a radial opening thereto along a sidewall of said container, said housing having a second cutter rotating about a second substantially vertical axis, said method comprising the steps of:

arranging a portion of said second cutter to project radially into said container;

loading said material in bulk into said container;

rotating said first cutter in a first direction to cut and rotate said material;

rotating said second cutter in the same direction as said first direction, thus resulting in an extremity of said second cutter travelling in an opposite direction to an extremity of said first cutter at a plane where the extremities intersect, thereby further cutting and processing said material within said container; and discharging said further cut and processed material from said apparatus.

51. The method of claim 50 wherein said second substantially vertical axis is substantially parallel to said sidewall.

52. An apparatus for use in the cutting, processing and discharge of material, said apparatus comprising:

a container having a first cutter driven about a vertical axis by a first driver;

a housing having a radial opening to said container along a sidewall of said container, said housing having therein a second cutter driven by a second driver, said second cutter protruding radially into said container and rotatable about a second axis, said vertical axis being substantially parallel to said sidewall;

discharge means for selectively discharging processed material from said apparatus.

53. An apparatus for use in the cutting, processing and discharge of material, said apparatus comprising:

a container having a first cutter driven about a vertical axis by a first driver;

a housing having a radial opening to said container along a sidewall of said container, said housing having therein a second cutter driven by a second driver, said second cutter protruding radially into said container and rotatable about a second axis, said second axis being substantially vertical;

discharge means for selectively discharging processed material from said apparatus.

54. The apparatus of claim 53 wherein said container is of inverted truncated conical configuration.

55. The apparatus of claim 53 wherein said first cutter comprises a support of helical configuration having a plurality of blades projecting therefrom and rotatable about a vertical axis.

56. The apparatus of claim 53 wherein said first cutter comprises a continuous helical blade.

57. The apparatus of claim 53 wherein said first cutter rotates at speeds in the range of 26 to 45 revolutions per minute.

58. The apparatus of claim 57 wherein said second driver has a gear reduction ratio such that said second driver rotates said second cutter in the range of 1000 to 3000 revolutions per minute.

59. The apparatus of claim 57 wherein said second driver has a gear reduction ration such that said second driver rotates said second cutter at about 2000 revolutions per minute.

60. The apparatus of claim 53 wherein said first driver comprises a direct mechanical connection from a power take-off of a tractor or a truck through a planetary gearbox.

61. The apparatus of claim 53 wherein said housing has a height in the range of 10 to 50 inches and a diameter in the range of 8 to 36 inches.

62. The apparatus of claim 61 wherein the housing has a height of 32 inches and a diameter of 21 inches.

63. The apparatus of claim 53 including a slidable cover selectively moveable relative to said radial opening between said housing and said container to selectively close said opening to limit exposure of said second cutter to said material.

64. The apparatus of claim 63 including a door in a rear wall of said housing.

65. The apparatus of claim 53 wherein said second cutter comprises a plurality of blades radially extending relative to said axis.

66. The apparatus of claim 53 wherein said second cutter comprises knives.

67. The apparatus of claim 66 wherein said knives are 6 inch long hammer knives.

68. The apparatus of claim 53 wherein said second cutter comprises cutting flails.

69. The apparatus of claim 53 wherein said second cutter comprises disc blades.

70. The apparatus of claim 69 wherein said disc blades have a diameter in the range of 16 to 24 inches.

71. The apparatus of claim 53 wherein said second driver comprises a direct mechanical connection from a power take-off of a tractor or a truck through a planetary gearbox.

72. The apparatus of claim 53 wherein said second cutter is selectively moveable inwardly and outwardly of said sidewall for varying the extent to which said second cutter protrudes into said container.

73. The apparatus of claim 53 wherein said second cutter protrudes into said container by at least 0.5 inches and at most 4 inches.

74. The apparatus of claim 73 wherein said second cutter protrudes into said container by about three inches.

75. The apparatus of claim 52 wherein said second axis is substantially parallel to said sidewall.

76. The apparatus of claim 53 including a plate selectively moveable through a plurality of positions and projectable into an orbit of rotation of said second cutter to restrict entry of said material into said housing.

77. The apparatus of claim 76 including a plurality of apertures in said plate to permit access of said second cutter to said material within said container.

78. The apparatus of claim 53 wherein said discharge means comprises a door on a sidewall of said container.

79. The apparatus of claim 78 wherein said door is hydraulically operated.

80. The apparatus of claim 53 including a door in a rear wall of said housing.

81. The apparatus of claim 80 wherein said door is longitudinally hinged.

82. The apparatus of claim 53 wherein said discharge means comprises at least one of a hydraulically operated door on a sidewall of said container or a longitudinally hinged door in a rear wall of said housing.

83. The apparatus of claim 53 wherein said first driver and said second driver rotate said first cutter and said second cutter in the same direction.

84. The apparatus of claim 53 wherein said first driver and said second driver rotate said first cutter and said second cutter in opposite directions.

* * * * *